Dec. 17, 1940.                B. J. SEAMAN                2,225,132
     LOCKING DEVICE FOR THE SECURING LUGS OR BOLTS OF VEHICLE WHEELS
                       Filed Aug. 11, 1939
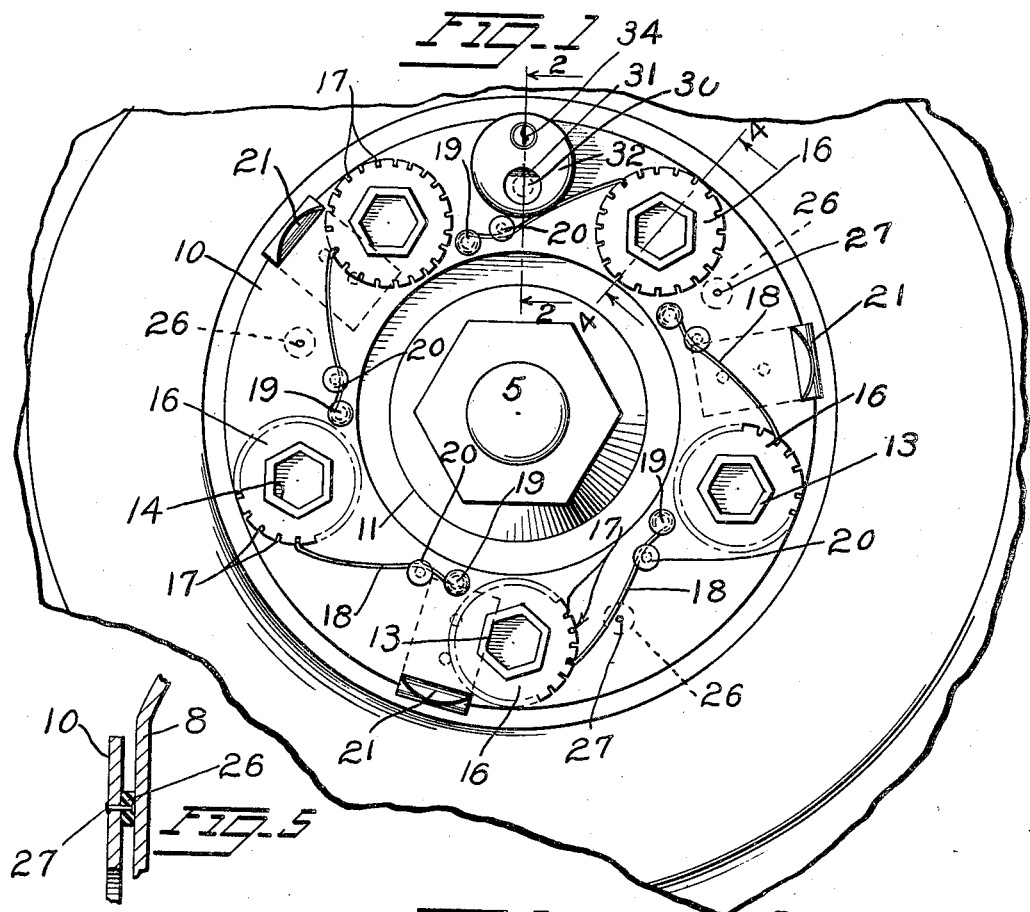
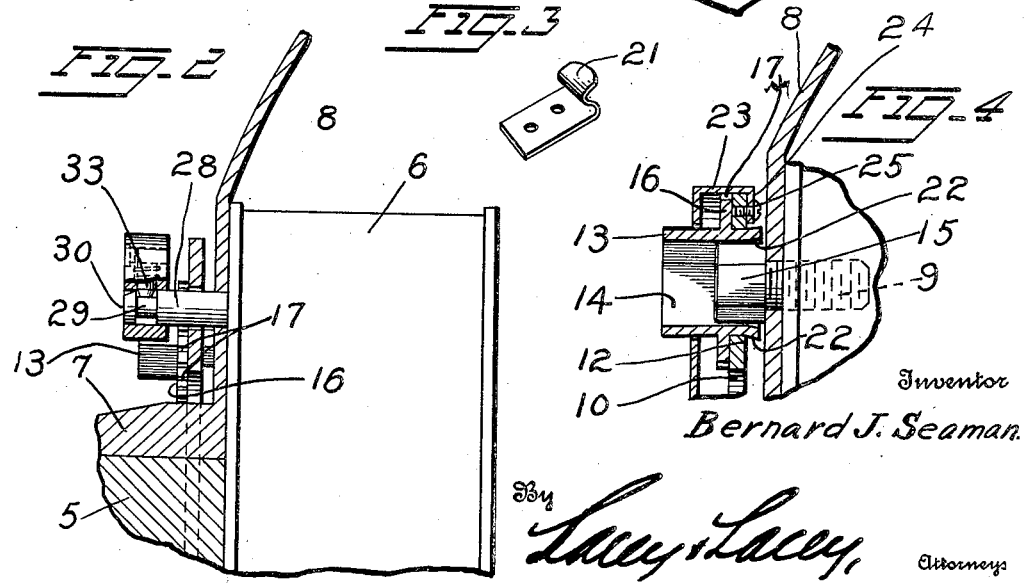
Inventor
Bernard J. Seaman.
By Lacey & Lacey, Attorneys Patented Dec. 17, 1940

2,225,132

UNITED STATES PATENT OFFICE 2,225,132

LOCKING DEVICE FOR THE SECURING LUGS OR BOLTS OF VEHICLE WHEELS

Bernard J. Seaman, Albuquerque, N. Mex.

Application August 11, 1939, Serial No. 289,679

6 Claims. (Cl. 70—259)

This invention relates to vehicle wheels and more particularly to means for locking the hub-securing lugs or bolts thereof against accidental rotation.

The object of the invention is to provide a comparatively simple and inexpensive device of the character described adapted to fit over the hub of a vehicle wheel and provided with spaced openings for the reception of the heads of the hub-securing bolts or lugs thereby to lock said bolts or lugs against accidental rotation and prevent the bolts from working loose and becoming lost.

A further object is to provide a bolt or lug lock comprising a flat disk having a series of drums or cylinders mounted for rotation therein and adapted to receive the heads of the securing bolts or lugs, said drums or cylinders being provided with pawl and ratchet mechanism to permit rotation of the cylinders in one direction to aline the heads of said lugs with receiving sockets formed in said cylinders.

A further object is to provide a key actuated lock which coacts with a stud or pin extending through the flat disk for preventing removal of said disk by an unauthorized person.

A further object is to provide the disk with spaced resilient pads or bumpers which contact the adjacent face of the vehicle wheel and serve to prevent vibration of the disk when traveling over rough uneven roads.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a front elevation of a portion of a vehicle wheel equipped with my improved lug locking device, the casing or housing being omitted to show the pawl and ratchet mechanism, Figure 2 is an enlarged vertical sectional view taken on the line 2—2 of Figure 1, Figure 3 is a perspective view of one of the spring clips detached, Figure 4 is a transverse sectional view taken on the line 4—4 of Figure 1 with the casing or housing in place, and Figure 5 is a detail vertical sectional view showing the construction of the resilient pads or bumpers.

The improved locking device forming the subject-matter of the present invention is especially designed to prevent accidental rotation of the hub-securing lugs or bolts of vehicle wheels, and by way of illustration is shown in connection with an automobile wheel of standard construction, in which 5 designates the axle, 6 the brake drum and 7 the hub provided with an integral face plate or disk 8 secured to the drum by a series of bolts or lugs 9 in the usual manner.

The device comprises a flat annular disk 10 formed of metal or other suitable material and having its central portion provided with an opening 11 adapted to fit over the hub 7 and its intermediate portion formed with an annular row of openings 12 adapted to receive rotating open-ended drums or cylinders 13. The outer ends of the cylinders are provided with sockets having angular walls 14, corresponding to the angular walls of the heads 15 of the bolts 9 so that, when the cylinders are fitted over said heads 15, the securing bolts or lugs 9 will be locked against accidental rotation and thus prevent the bolts from working loose and becoming lost. Each rotating drum or cylinder 13 is provided with an annular flange 16 which bears against the adjacent face of the disk 10 and is formed with a series of peripheral ratchet teeth 17 for engagement with a resilient pawl 18. One end of each pawl is secured to an anchoring stud 19 and is thence extended over a tension stud 20 for engagement with the ratchet teeth on the adjacent flange, the parts being so arranged that the drums can rotate in one direction but are locked against rotation in the reverse direction.

Secured to the face plate or disk 8 are a series of spring clips 21 which extend over the peripheral edge of the disk 10 and assist in holding said disk in position on the vehicle wheel. The metal at the inner ends of the rotating cylinders or drums 13 is preferably expanded laterally, as indicated at 22, so as to prevent accidental displacement of the drums while at the same time permitting said drums to rotate freely within the openings in the disk 10. If desired, a casing or housing 23 may extend over and around the pawl and ratchet mechanism so as to house and protect the same. This casing or housing 23 may be secured in place on the wheel in any suitable manner, but it is preferred to have the rear wall of the casing provided with one or more inwardly extending securing lugs 24 which bear against the rear face of the disk 10 and are detachably secured thereto by screws or similar fastening devices 25, as best illustrated in Figure 4 of the drawing.

In order to prevent accidental vibration of the disk 10 and its associated parts when the vehicle is traveling over rough uneven roads, there are provided one or more resilient bumpers 26 secured by pins 27 to said disk with their outer faces contacting with the face plate 8, as best shown in Figure 5 of the drawing. Projecting laterally from the face plate 8 of the vehicle wheel and rigidly secured thereto in any suitable manner is a locking pin 28 having an annular groove 29 formed in the outer end thereof and defining a terminal head 30, one side of which is preferably beveled, as indicated at 31.

In order to prevent an unauthorized person from removing the disk 10 in an effort to loosen the bolts 9 and remove the wheel, I provide a lock 32 having a spring-pressed tumbler 33 slidably mounted therein and adapted to enter the groove 29 and this tumbler 33 cannot be retracted to permit removal of the lock until a suitable key is inserted in the keyhole 34 of said lock. Owing to the fact that the head 30 of the lock pin 28 is provided with a beveled surface 31, the lock 32 may be readily slid over the head 30 of the pin as the end of the tumbler 33 will engage the inclined face 31 and thereby be forced rearwardly until the end of the tumbler registers with the groove 29 when the spring of the tumbler will force said tumbler into the groove and in which position it cannot be retracted until the lock is opened by a suitable key. It will, of course, be understood that each wheel of an automobile will be provided with a lock 32 of similar construction so that one key will suffice to open all four locks.

In applying the device to an automobile wheel, the disk is positioned over the face plate 8 and the drums or cylinders 13 individually rotated until the angular socket walls thereof register with the angular faces on the adjacent bolt heads 15, after which the disk 10 is pressed inwardly against the clips 21 which snap over the adjacent face of the disk and retain said disk in position on the wheel. The lock 32 is then fitted over the locking pin 28 in the manner before described so that only a person having a key to fit the lock can remove the locking disk 10, thereby preventing fraudulent removal and theft of the parts, as will be readily understood. It will, of course, be understood that there will be as many rotating locking cylinders or drums as there are securing bolts or lugs on the vehicle wheel and that in certain cases the clips 21 may be dispensed with if desired.

The devices may be made in different sizes and shapes and used in connection with any style or type of vehicle wheel without departing from the spirit of the invention.

Having thus described the invention, what is claimed as new is:

1. In a vehicle wheel having a hub and provided with securing bolts having angular heads, a locking member fitting over said hub and provided with openings, ratchet drums mounted for rotation in said openings and provided with angular sockets adapted to receive the heads of the securing bolts, and means for detachably securing said member in position on the hub of the vehicle wheel.

2. In a vehicle wheel having a hub and provided with securing bolts having angular heads, a locking member fitting over said hub and provided with openings, ratchet drums rotatably mounted in said openings and provided with angular sockets adapted to receive the heads of the securing bolts, a locking pin projecting from the hub, and a lock detachably engaging said pin.

3. In a vehicle wheel having a hub and provided with securing bolts having angular heads, a locking disk fitted over the hub and provided with a series of spaced openings, drums journaled in said openings and provided with angular sockets adapted to receive the heads of the securing bolts, flanges extending laterally from the drums and provided with peripheral ratchet teeth, spring-pressed pawls secured to the locking disk and engaging the peripheral teeth of the drums, a housing for said pawl and ratchet mechanism, a pin extending laterally from the hub, and a key actuated lock detachably engaging the pin.

4. In a vehicle wheel having a hub and provided with securing bolts having angular heads, a locking disk detachably fitted over the hub and provided with an annular row of openings, ratchet drums mounted for rotation in said openings and provided with sockets having angular walls engaging the angular heads of the securing bolts, spring clips secured to the hub and having their outer ends overlapping the peripheral edge of the locking disk, resilient bumpers secured to the rear face of the locking disk for engagement with the hub of a vehicle wheel, a locking pin extending laterally from said hub, and a key actuated lock engaging said pin.

5. In a vehicle wheel having a hub and provided with securing bolts having angular heads, a locking member detachably fitting over the hub and provided with a series of openings, ratchet drums journaled in said openings and provided with sockets having angular walls receiving the angular heads of the securing bolts, a casing covering the ratchet mechanism of the drums and provided with inwardly extending lugs detachably secured to the rear face of the locking member, cushioning members carried by the locking member and bearing against the hub of the vehicle wheel, a locking pin extending laterally from the hub, and a key actuated lock detachably engaging said locking pin.

6. In a vehicle wheel having a hub and provided with securing bolts having angular heads, a locking disk detachably fitted over the hub and provided with an annular row of openings, drums mounted for rotation in said openings and provided with angular sockets adapted to receive the angular heads of the securing bolts, flanges extending laterally from the drums and provided with peripheral ratchet teeth, spring-pressed pawls mounted on the outer face of the disk and engaging the peripheral teeth of said flanges whereby to permit rotation of the drums in one direction but not in another, a housing for said pawls and ratchet teeth, a locking pin extending laterally from the hub, and a key actuated lock engaging said locking pin.

BERNARD J. SEAMAN.